United States Patent
Neltner et al.

(10) Patent No.: US 11,751,679 B2
(45) Date of Patent: Sep. 12, 2023

(54) DISMANTLABLE TABLE COMPRISING QUICK FASTENING MEANS FOR FASTENING THE TABLETOP TO A STRUCTURE

(71) Applicant: LAFUMA MOBILIER SAS, Anneyron (FR)

(72) Inventors: Jean-Baptiste Neltner, Saint Genis Laval (FR); Corrado Roani, Manthes (FR); Jean-Noël Pernet, Condamine la Doye (FR)

(73) Assignee: LAFUMA MOBILIER SAS, Anneyron (FR)

( * ) Notice: Subject to any disclaimer, the term of this patent is extended or adjusted under 35 U.S.C. 154(b) by 48 days.

(21) Appl. No.: 17/599,783

(22) PCT Filed: Apr. 1, 2020

(86) PCT No.: PCT/EP2020/059204
§ 371 (c)(1),
(2) Date: Sep. 29, 2021

(87) PCT Pub. No.: WO2020/201324
PCT Pub. Date: Oct. 8, 2020

(65) Prior Publication Data
US 2022/0142355 A1  May 12, 2022

(30) Foreign Application Priority Data
Apr. 1, 2019  (FR) ...................................... 19/03439

(51) Int. Cl.
*A47B 13/00* (2006.01)

(52) U.S. Cl.
CPC .................................. *A47B 13/003* (2013.01)

(58) Field of Classification Search
CPC ........... A47B 13/003; A47B 3/12; A47B 3/06; A47B 2013/002; A47B 2013/026; A47B 47/0025; A47B 47/0058
(Continued)

(56) References Cited

U.S. PATENT DOCUMENTS 1,793,709 A * 2/1931 Meyers .................... F16B 12/48
                                                   108/157.16
1,795,138 A * 3/1931 Ohnstrand ........... A47B 13/003
                                                   108/157.15
(Continued)

FOREIGN PATENT DOCUMENTS

| DE | 4402520 C1 * | 7/1995 | ........... A47B 13/003 |
| DE | 202005009719 U1 | 9/2005 | |
| EP | 1192874 A1 | 4/2002 | |

OTHER PUBLICATIONS

International Search Report dated Apr. 28, 2020 re: Application No. PCT/EP2020/059204, pp. 1-2, citing: EP 1192874 A1 and DE 202005009719 U1.

*Primary Examiner* — Jose V Chen
(74) *Attorney, Agent, or Firm* — CANTOR COLBURN LLP

(57) ABSTRACT

A dismantlable table includes a tabletop that is fastened by a fastening component to a structure forming a frame, the structure having a lip that lies flat under the tabletop. Each fastening component includes a latch that is rotatable about a vertical axis, having at least one laterally protruding boss, and includes a recess formed under the tabletop that has at least one protrusion facing the axis. In a mounting position, the bosses pass into the recess next to the protrusions, and in a locking position following rotation, the bosses fit above the protrusions, a lower bearing plane of the latch lying under the lip of the structure.

15 Claims, 4 Drawing Sheets

(58) Field of Classification Search
USPC .................... 108/159.11, 157.1, 154, 155
See application file for complete search history.

(56) References Cited

U.S. PATENT DOCUMENTS

| | | | | |
|---|---|---|---|---|
| 2,010,394 A * | 8/1935 | Herman | .............. | F16B 12/2063 217/69 |
| 2,729,279 A * | 1/1956 | Axtell | ...................... | A47C 5/06 108/155 |
| 2,840,431 A * | 6/1958 | Budai | .................. | A47B 87/002 312/111 |
| 2,987,362 A * | 6/1961 | Bernath | .................. | F16B 12/20 312/264 |
| 3,521,579 A * | 7/1970 | Stafford | .................. | A47B 13/06 108/158.11 |
| 4,944,235 A * | 7/1990 | Jahnke | .................. | A47B 13/003 108/154 |
| 5,232,303 A * | 8/1993 | Rubner | ................ | A47B 87/002 403/252 |
| 5,267,713 A * | 12/1993 | Lewis | ...................... | A47B 9/00 248/188.4 |
| 6,318,276 B1 * | 11/2001 | Reinecke | ............. | A47B 87/002 108/158.13 |
| 7,765,937 B2 * | 8/2010 | Weissenrieder | ..... | A47B 13/021 248/188 |
| 8,584,602 B2 * | 11/2013 | Isgro | ........................ | B01L 9/02 108/157.1 |
| 8,689,705 B2 * | 4/2014 | Martin | .................. | A47B 17/04 108/50.02 |
| 8,789,477 B2 * | 7/2014 | Jimenez Mangas | ... | A47B 13/02 108/115 |
| 9,578,959 B2 * | 2/2017 | Isgrò | ..................... | A47B 13/088 |
| 2021/0100356 A1 * | 4/2021 | Huang | .................. | A47B 17/03 |
| 2022/0257003 A1 * | 8/2022 | Ergun | ..................... | A47B 9/20 |

\* cited by examiner

[Fig. 1]
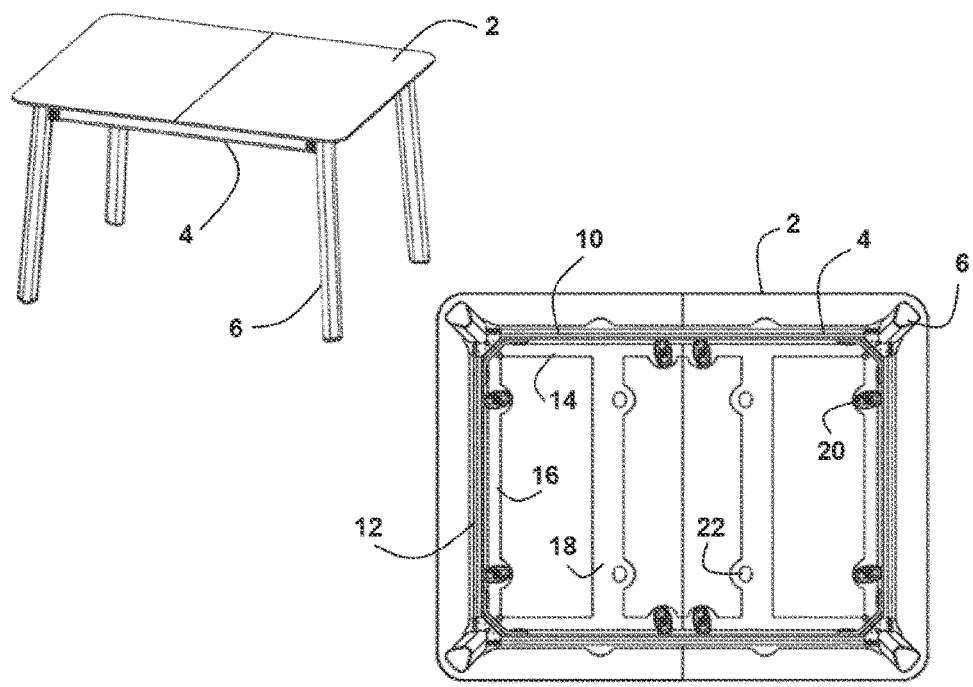
[Fig. 2]
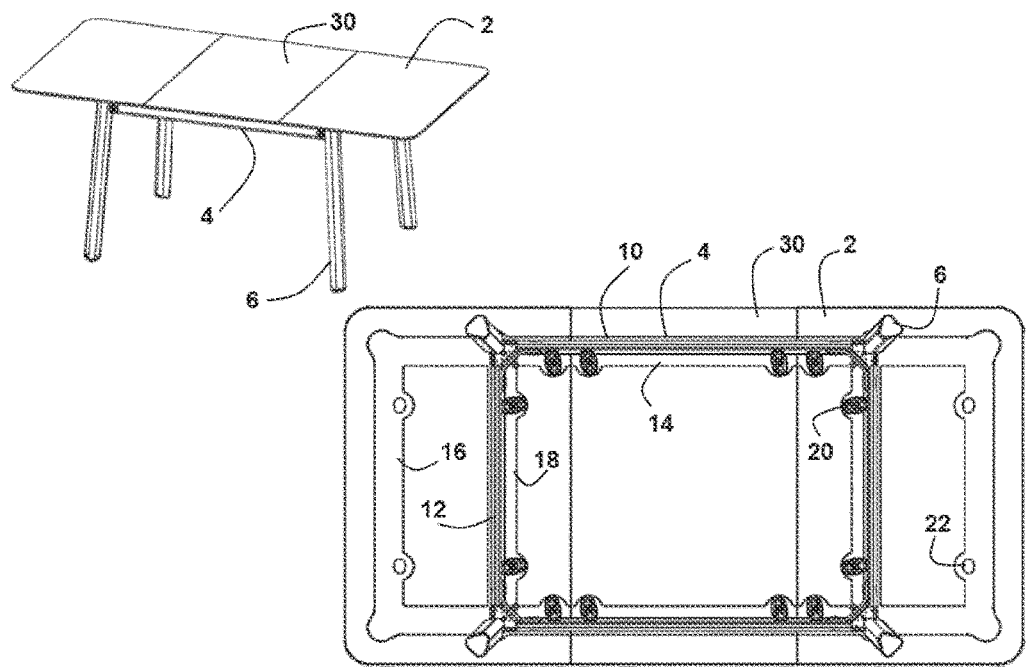

[Fig. 3]
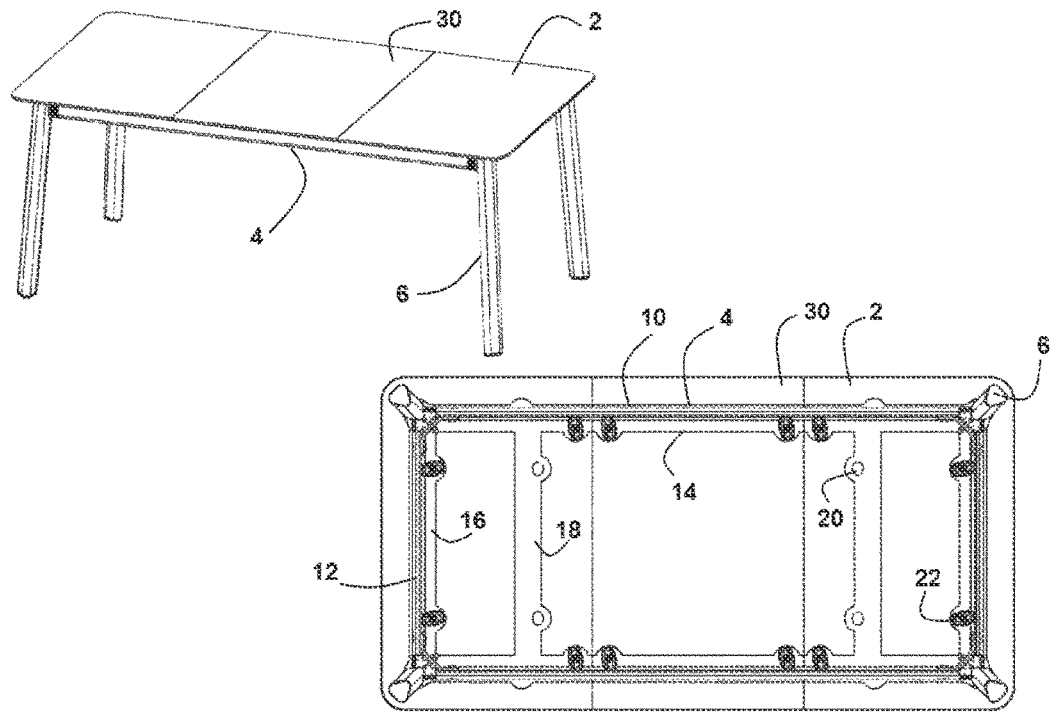
[Fig. 4]
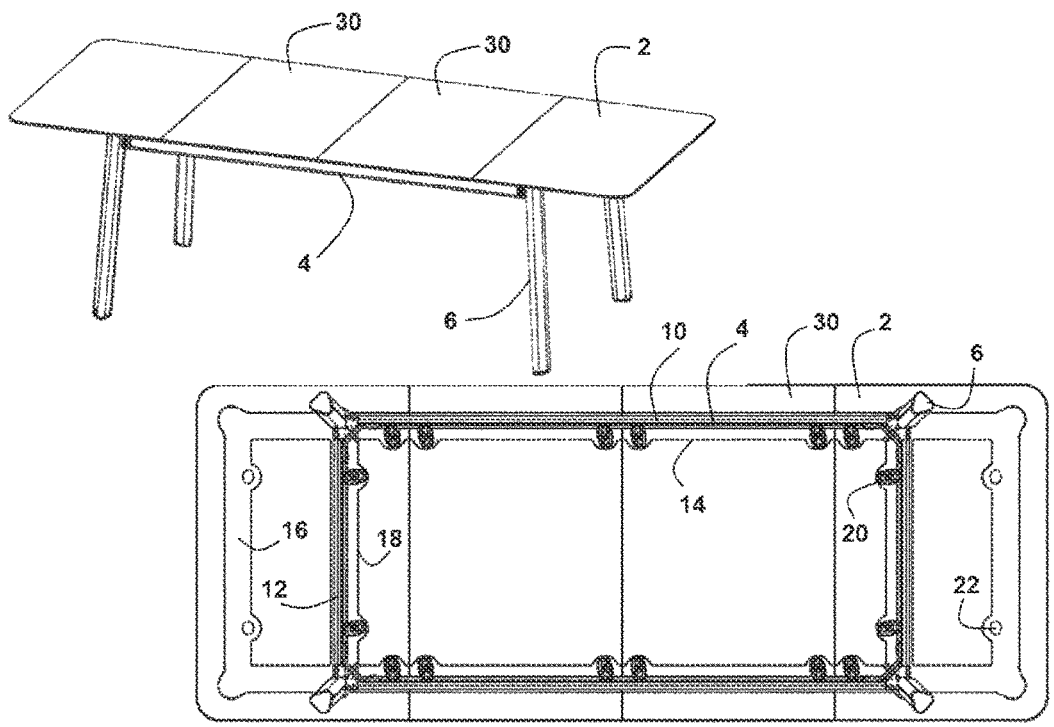

[Fig. 5]
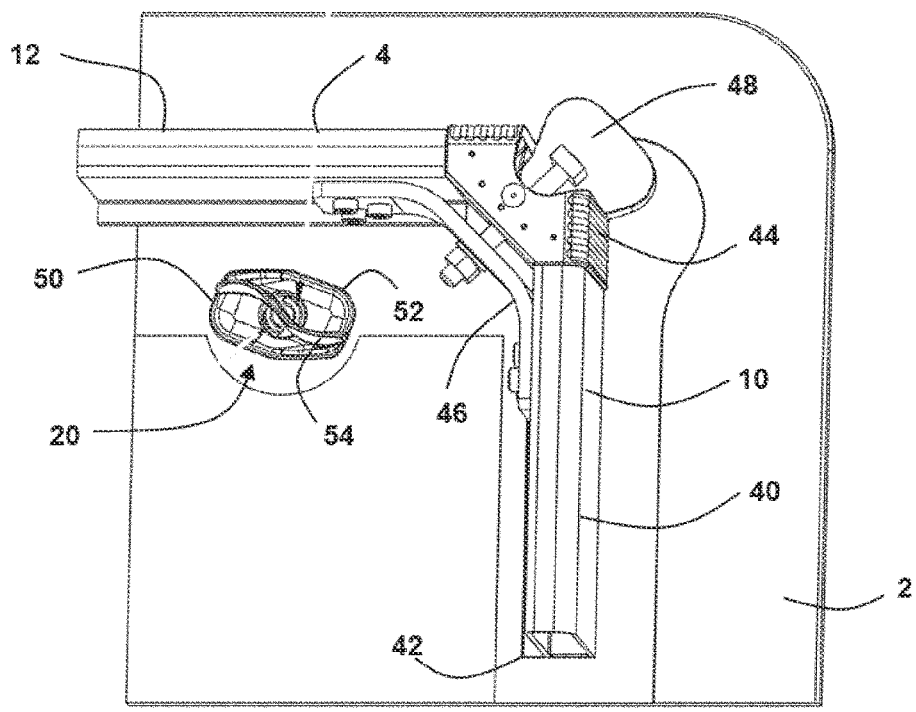
[Fig. 6]
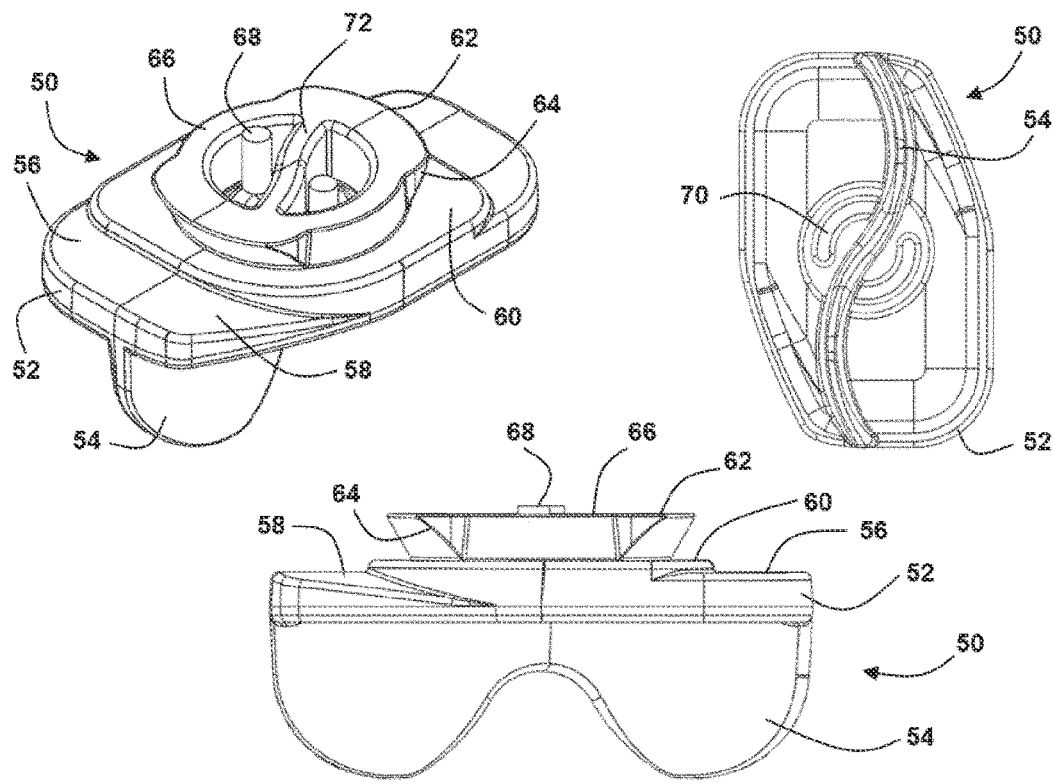

[Fig. 7]
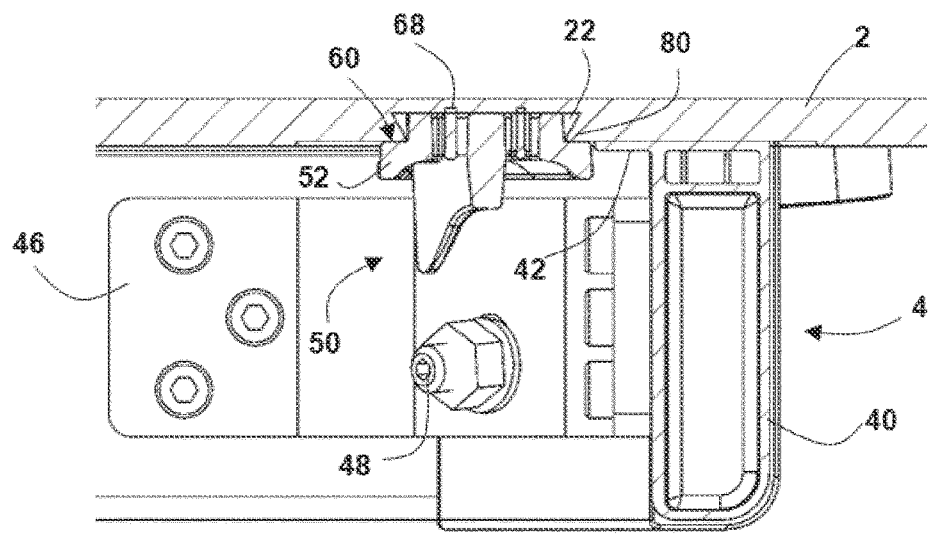
[Fig. 8]
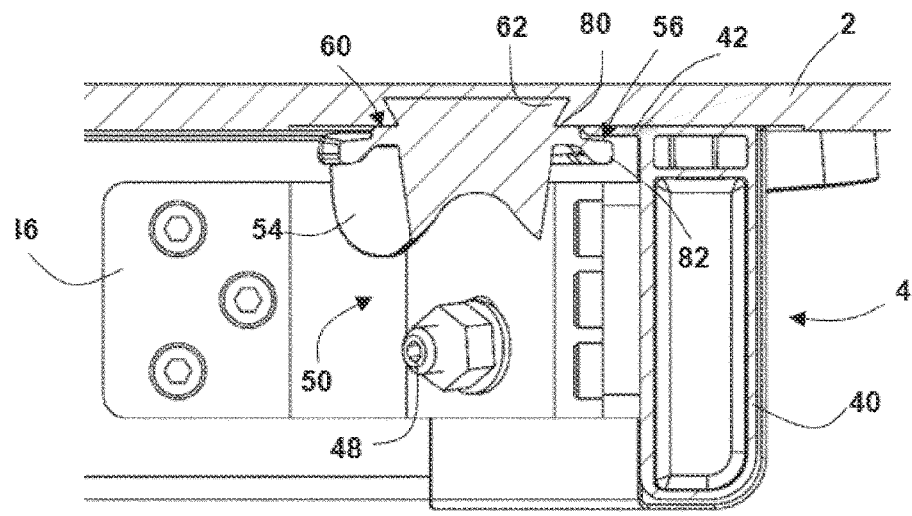
[Fig. 9]
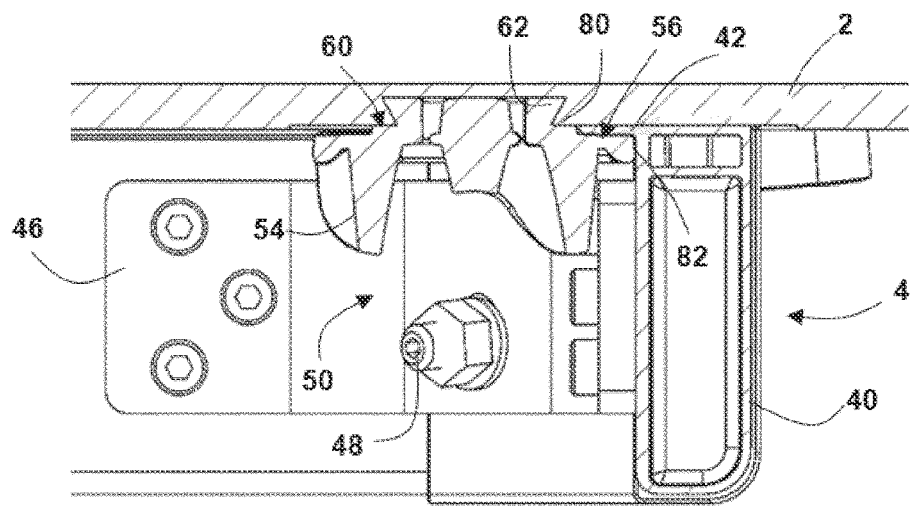

DISMANTLABLE TABLE COMPRISING QUICK FASTENING MEANS FOR FASTENING THE TABLETOP TO A STRUCTURE

TECHNICAL FIELD

The present disclosure concerns a quick-dismantle modular table, as well as a method for assembling such a table.

BACKGROUND

Some tables, especially garden tables, include a tabletop that could be easily dismantled to make different configurations by adding extensions, or to fold up the table for storage when it is no longer in use. This type of dismountable table may also be used indoors, for example in an office or as a side table.

In addition, the dismantling of the table facilitates packaging and transport thereof. By producing for example a flat base structure receiving above the tabletop and at the corners the feet, these elements may be separated in order to pack them in flat cardboard boxes which will be easily stored and transported.

In order to fasten the tabletop on the structure, it is known to provide for screws coming from below into the holes in this structure, which engage in threads on the lower face of the tabletop. These screws are then screwed with a wrench, which is relatively long to perform, and impractical for tables that have to be dismantled frequently.

In addition, this fastening system requires a certain length of threading, which requires a sufficient thickness at the fasteners. The tabletop becomes more bulky in its thickness, its storage or transport is not facilitated.

It is known to produce other systems for fastening the tabletop on the structure, comprising for example on one element a sliding latch which engages in a hole in the other element. However, this latch system does not allow the tabletop to be easily positioned on the structure, and may have a significant thickness.

SUMMARY

The present disclosure aims in particular at overcoming these drawbacks of the prior art.

For this purpose, it provides a dismountable table comprising a tabletop fastened by fasteners on a structure forming a frame, this table being remarkable in that the structure includes a flange coming flat under the tabletop, each fastener comprising a latch, rotatable along a vertical axis, having at least one boss projecting laterally, and comprising a recess, formed under the tabletop, having at least one protrusion oriented towards the axis, in a mounting position the bosses fitting into the recess next to the protrusions, and in a blocking position after rotation the bosses fitting above the protrusions, a lower bearing plane of the latch coming under the flange of the structure.

An advantage of the table according to the disclosure is that with a latch forming a single portion, it is simply possible, after placing the tabletop on the structure, to engage the bosses at the bottom of the recess for each fastener by putting the latch in its mounting position, then after a fraction of a turn of this latch performed manually in a rapid manner, engage the side bosses above the protrusions by tightening these bosses axially on the bottom of the recess. At the same time, the lower bearing plane of the latch comes under the flange of the structure, to hold it.

It is also possible to carry out a self-centering of each latch in its recess, and a self-alignment of the structure with respect to the different latches.

A positioning and an effective clamping of the tabletop on the structure are achieved quickly and without tools. By providing for shallow recesses across the thickness of the tabletop, a very flat fastening system that does not increase the thickness of the tabletop is obtained.

The table according to the disclosure may further include one or more of the following features, which may be combined together.

Advantageously, the latch includes two opposing bosses coming, in the blocking position, each above a protrusion.

Advantageously, each boss includes a lower face tilted in the direction of the axis of rotation of the latch, each protrusion comprising an upper face tilted at the same angle.

Advantageously, each latch includes an upper bearing plane disposed above the lower bearing plane, bearing on the lower face of the tabletop.

Advantageously, the latch being laid in a transverse direction, each end includes a lower bearing plane.

In this case, each lower bearing plane advantageously terminates forwards in the direction of the blocking rotation, with a tilted face which descends downwards.

Advantageously, the radially outer outline of each latch includes an increasing radius which gradually comes to bear during the blocking rotation of this latch on one side of the frame.

Advantageously, the upper face of the latch includes elastic studs projecting above this face.

Advantageously, the frame includes extruded profiles comprising the flange formed in these profiles.

The disclosure also relates to a method for assembling a tabletop of dismountable table on a structure by means of fasteners, remarkable in that the structure comprising a flange coming flat under the tabletop, for each fastener it includes a step of inserting an upper portion of a latch, rotatable along a vertical axis, comprising at least one boss projecting laterally, into a recess, formed under the tabletop, having at least one protrusion oriented towards the axis, then a step of rotating the latch to a blocking position, inserting the bosses above the protrusions, and sliding a lower bearing plane of the latch under the flange of the structure.

BRIEF DESCRIPTION OF THE DRAWINGS

The disclosure will be better understood and other features and advantages will become apparent more clearly upon reading the following description provided as example, with reference to the appended drawings in which:

FIG. 1 successively presents in perspective and in bottom view a table according to the disclosure comprising a two-part tabletop placed on a short structure;

FIG. 2 successively presents in perspective and in bottom view a table according to a variant with the three-part tabletop comprising a central extension;

FIG. 3 successively presents in perspective and in bottom view a table according to a variant with a three-part tabletop placed on a long structure;

FIG. 4 successively presents in perspective and in bottom view this table with a four-part tabletop;

FIG. 5 presents in bottom view a corner of the table comprising a fastener of the tabletop on the structure;

FIG. 6 successively presents in perspective, in bottom view and in side view a latch of this fastener.

FIG. 7 presents in section along the axis of the latch, the fastener during the positioning of this latch;

FIG. 8 presents in section along the axis of the latch the fastener oriented at the beginning of clamping; and FIG. 9 presents in section along the axis of the latch the fastener oriented at the end of clamping.

DETAILED DESCRIPTION OF THE DRAWINGS

FIG. 1 presents a rectangular table having a midplane of symmetry disposed in the transverse direction, comprising a tabletop formed of two elements 2, fastened on a flat structure 4 receiving a foot 6 at each corner.

The structure 4 forms a rectangle comprising two longitudinal members 10 connected by two cross members 12, these longitudinal members and these cross members being formed in the same profile made of aluminum alloy.

The underside of the tabletop has a fastening surface for fastening the structure 4 forming a rectangle comprising two longitudinal portions 14 fitting on the longitudinal members 10, two inner transverse portions 18, and two transverse end portions 16 each receiving a cross member 12 of the structure 4.

The fastening surface of the tabletop includes recesses 22 which may modularly receive quick fasteners 20, which will at the same time clamp a flange of the profiles of this structure and bear against the side of these profiles, to ensure both a lateral positioning and an effective support of the tabletop on this structure.

Each transverse portion 16, 18 of the fastening surface of the tabletop has two recesses 22. Each longitudinal portion 10 of the fastening surface includes a recess 22 disposed near the midplane of the table.

Fasteners 20 are disposed on the recesses 22 of the two transverse end portions 16 and those of the longitudinal portions 14.

FIG. 2 presents a table with the same structure 4, receiving an extension forming a central element 30 interposed between the two end elements of the tabletop 2.

Each tabletop element 2 is fastened by the recesses 22 of the inner transverse portion 18 of the fastening surface, and those of the longitudinal portions 14. The extension 30 includes two longitudinal portions 14 of the fastening surface, each comprising a recess 22 at each end, receiving a fastener 20.

In this way, the same structure 4 is used to quickly fasten two or three elements forming the tabletop. The profiles of the structure having a constant section may receive the fasteners 20 at any point, which confers great modularity on the table. In addition, the longitudinal members 10 and the cross members 12 of the structure 4 formed by profiles cut to any length when requested, allow any table dimension to be produced.

FIG. 3 presents a long structure 4, receiving the same tabletop formed of three elements 2, 30 presented in FIG. 2. The cross members 12 of the structure 4 are fastened to the transverse end portions 16 of the end elements 2 of the tabletop, which confers greater stability on this tabletop.

FIG. 4 presents the same long structure 4 of the table presented in FIG. 3, receiving two central elements 30 forming two extensions interposed between two end elements of the tabletop 2. The cross members 12 of the structure 4 are fastened to the inner transverse portions 18 of the end elements 2.

FIG. 5 presents a corner of the table comprising two profiles of identical section 40 joining together to form the corner, formed by an extruded aluminum alloy having a rectangular section disposed vertically, and a flange 42 facing the interior of the table, laid flat under the tabletop.

The corner joint between the profiles 40 includes a joint part 44 guiding the outer sides of the profiles, and a clamping band 46 screwed onto the inner sides of these profiles. A screw with a fin 48 disposed in the midplane between the two profiles 40, clamps the joint part 44 and the clamping band 46 towards each other.

The fastener 20 includes a latch 50 rotatable along a vertical axis, having an elongated shape transversely disposed in the mounting position presented in this figure, parallel to a cross member 12, receiving under a horizontal plate 52 two curved fins 54 aligned along the shape extension, allowing a manual rotational force to be applied on this latch.

FIG. 6 presents the latch 50 comprising on the plate 52 successively starting from the top, a central circular shape 66 including two opposite lateral bosses 62 each extending over approximately a quarter of a turn, an upper bearing plane 60 projecting around this circular shape, then a lower bearing plane 56 in two portions, covering only the elongated ends of the plate.

The underside of the bosses 62 has a lower face 64 tilted at 30° with respect to the vertical towards the axis of rotation of the latch 50. The height between the upper bearing plane 60 and the lower bearing plane 56 is equal to the thickness of the flange 42 of the profiles 40. Each portion of the lower bearing plane 56 terminates forwards in the direction of the blocking rotation, by a slightly-tilted face 58 which descends downwards.

The center of the upper circular shape 66 includes a bar 72 disposed in a diameter, leaving on each side a recess each receiving a vertical stud 68 whose upper end protrudes above the upper face of this circular shape.

A flexible tab 70 shaped like an arc of circle centered on the axis of the latch 50, disposed in a horizontal plane, connects the lower end of each stud 68 to the bar 72 so as to allow the stud to be resiliently pushed downwards while descending its upper end towards the upper face of the circular shape 66, to form a backlash adjustment elastic device.

FIG. 7 presents the recess 22 formed by machining across the thickness of the tabletop, over about two thirds of this thickness, having a flat bottom. In this way, we obtain elements 2, 30 of the tabletop having a completely smooth underside, which facilitates packaging, storage or transport.

The recess 22 with a generally circular shape, includes on two opposite sides a protrusion 80 facing the center, each extending over about a quarter of a turn, having an upper face tilted at 30° with respect to the vertical axis.

In this way, the latch 50 allows, in a mounting position, fitting into the recess 22 by arranging its lateral bosses 62 between the protrusions 80, as presented in FIG. 7. The upper bearing plane 60 bears under the flat face of the panel.

FIG. 8 presents, after a rotation of the latch 50, the bosses 62 which have slipped above the protrusions 80 with the slopes at 30° adjusted one on the other, ensuring self-centering of the latch in the recess 22 thanks to these slopes, and effective axial support of this latch which cannot come out.

At the same time, the slightly-tilted face 58 of one of the two lower bearing planes 56 arrives below the flange 42 of the profile 40, this slope forming an inlet chamfer facilitating the passage under this flange.

FIG. 9 presents the rotation over a little less than a quarter of a turn of the latch 50, which confirms the positioning of a lower bearing plane 56 under the flange 42 of the profile 40.

Each elongated portion of the latch 50 has a radially outer outline 82 comprising an increasing radius, forming a small slope so as to obtain, during the rotation of this latch, an increasing radius, and a progressive lateral clamping on the edge of the profile 40.

At the end of rotation of all latches 50, for each fastener 20, both axial clamping of the tabletop under the flange 42 of the profile 40, and a lateral wedging of this tabletop on the structure 4 are completed. Each element 2, 30 of the tabletop is thus fixedly fastened to the structure 4 by four fasteners 20, which forms a very rigid assembly.

During the assembly of each latch 50 the studs 68 mounted on the elastic tabs 70 protruding above the upper face of the circular shape 66, compress their tabs by bearing on the bottom of the recess 22. In this way, an axial pressure is maintained downward on the latch 50, taking up any axial clearance of the bosses 62 above the protrusions 80, which prevents the free rotation of the latch, in particular by vibrations. The latches 50 are also held in this way in the recesses 22 when the structure 4 is not mounted, for example to store the tabletop with its latches remaining fastened below.

A modular table is obtained simply, quickly and without tools, comprising a number of elements 2, 30 forming the tabletop which may be variable, by using profiles 40 having, for the longitudinal members 10, lengths adjusted to this number of elements.

The invention claimed is:

1. A dismountable table comprising: a tabletop fastened by a plurality of fasteners on a structure forming a frame, wherein the structure includes a flange bearing against a lower face of the tabletop, each fastener comprising a latch, rotatable along an axis of rotation which is vertical, provided with an upper portion having at least one boss projecting laterally, and comprising a recess, provided on the tabletop and emerging in the lower face of the tabletop, having a bottom and at least one protrusion oriented towards the axis of rotation, the upper portion of each latch being configured to be inserted in the respective recess, in a mounting position the at least one boss of each latch being received into the respective recess and being angularly offset from the respective at least one protrusion, and in a blocking position, after rotation, the at least one boss of each latch fitting above the respective at least one protrusion and a lower bearing plane of each latch coming under the flange of the structure in order to ensure an axial clamping of the tabletop on the frame.

2. The dismountable table according to claim 1, wherein each latch includes two opposed bosses coming, in the blocking position, each above a respective protrusion.

3. The dismountable table according to claim 1, wherein each boss includes a lower face tilted towards the axis of rotation of the respective latch, each protrusion comprising an upper face tilted at the same angle.

4. The dismountable table according to claim 1, wherein each latch includes an upper bearing plane, disposed above the respective lower bearing plane, bearing against the lower face of the tabletop.

5. The dismountable table according to claim 1, wherein each latch is elongated along a transverse direction and includes two opposite ends each including a lower bearing plane.

6. The dismountable table according to claim 1, wherein a radially outer outline of each latch includes an increasing radius which gradually comes to bear, during the blocking rotation of this latch, on one side of the frame.

7. The dismountable table according to claim 1, wherein each latch includes elastic studs projecting from an upper face of said latch.

8. The dismountable table according to claim 1, wherein the frame includes extruded profiles comprising the flange formed in these extruded profiles.

9. A method for assembling a dismountable tabletop on a structure by a plurality of fasteners, wherein the structure comprises a flange bearing against a lower face of the tabletop, for each fastener the method includes the following steps:
   inserting an upper portion of a latch, rotatable along an axis of rotation which is vertical, comprising at least one boss projecting laterally, in a recess, provided on the tabletop and emerging in the lower face of the tabletop, having a bottom and at least one protrusion oriented towards the axis of rotation, such that the at least one boss of the latch is angularly offset from the respective at least one protrusion,
   rotating the latch towards a blocking position, inserting the least one boss above the respective at least one protrusion, and
   sliding a lower bearing plane of the latch under the flange of the structure in order to ensure an axial clamping of the tabletop on the frame.

10. The dismountable table according to claim 1, wherein each recess has a flat bottom and a generally circular shape.

11. The dismountable table according to claim 1, wherein each latch is made in one piece.

12. The dismountable table according to claim 1, wherein each latch is removable with respect to the structure.

13. The dismountable table according to claim 1, wherein, in the mounting position, each latch is configured to be axially inserted in the respective recess.

14. The dismountable table according to claim 1, wherein the structure has a rectangular shape, and includes two longitudinal members connected by two cross members.

15. A dismountable table comprising: a tabletop fastened by a plurality of fasteners on a structure forming a frame, wherein the structure has a rectangular shape and includes two longitudinal members connected by two cross members, at least one of the longitudinal members and of the cross members including a flange bearing against a lower face of the tabletop, each fastener comprising a latch, rotatable along an axis of rotation which is vertical between a mounting position and a blocking position, provided with an upper portion having at least one boss projecting laterally, and comprising a recess, provided on the tabletop and emerging in the lower face of the tabletop, having a bottom and at least one protrusion oriented towards the axis of rotation, the upper portion of each latch being configured to be inserted in the respective recess, in the mounting position the at least one boss of each latch being received into the respective recess and being angularly offset from the respective at least one protrusion and a lower bearing surface of each latch being angularly offset from the flange of the structure, and in the blocking position, after rotation, the at least one boss of each latch fitting above the respective at least one protrusion and the lower bearing surface of each latch coming under the flange of the structure and exerting a bearing force against said flange in order to ensure an axial clamping of the tabletop on the frame.

* * * * *